Sept. 22, 1953      C. F. GLASSER      2,652,656
TRAP
Filed March 10, 1949      2 Sheets-Sheet 1
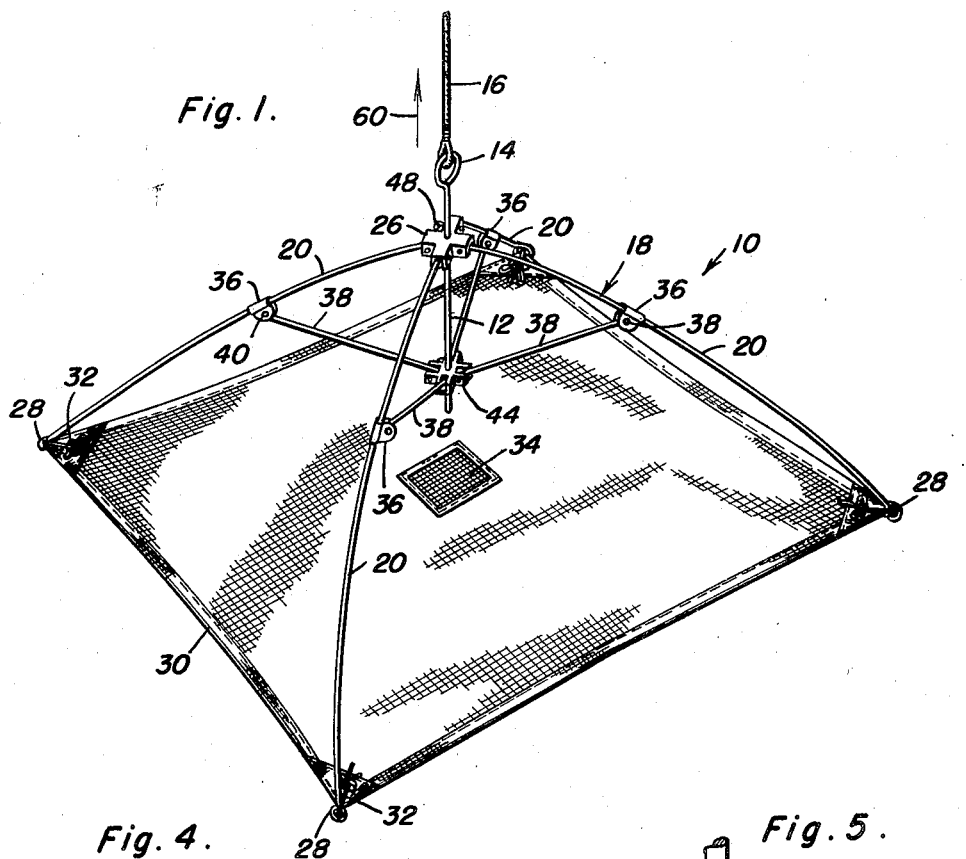
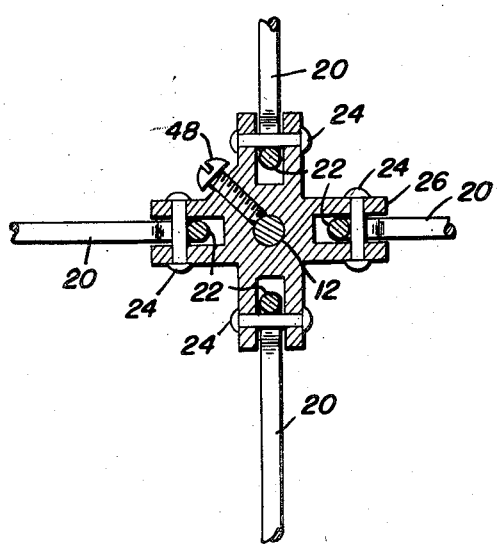
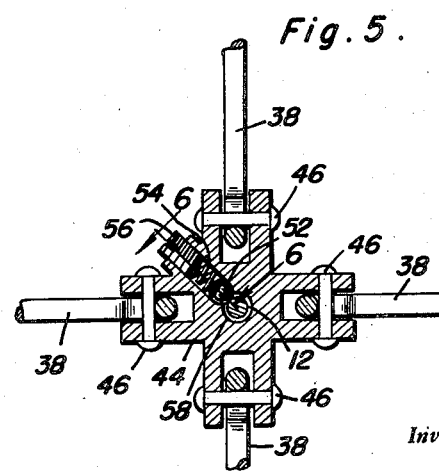
Inventor
Charles F. Glasser
By Clarence A. O'Brien
and Harvey B. Jacobson
Attorneys Sept. 22, 1953        C. F. GLASSER              2,652,656
                         TRAP
Filed March 10, 1949                         2 Sheets-Sheet 2
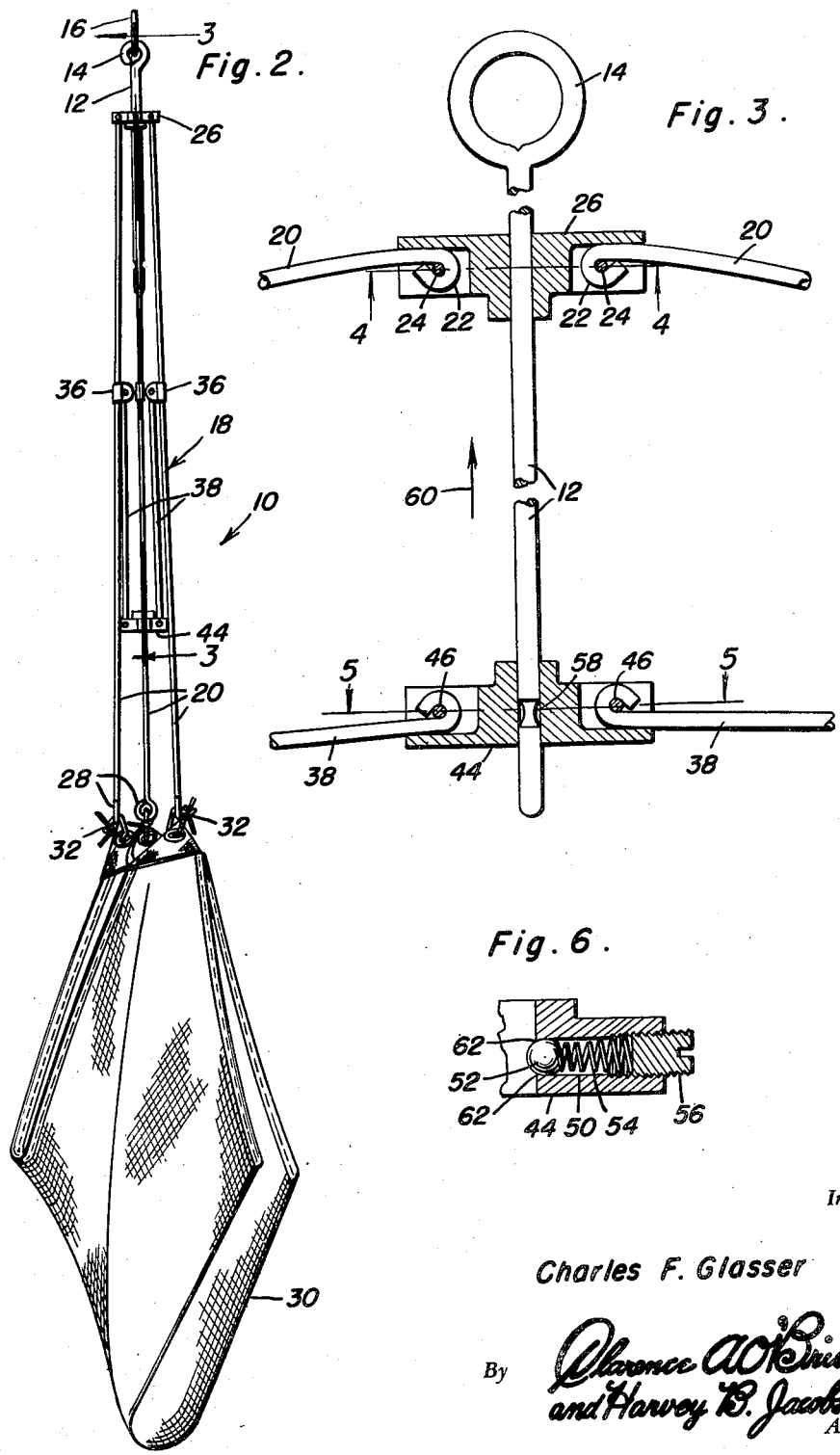
Inventor
Charles F. Glasser
By Clarence A. O'Brien
and Harvey B. Jacobson
Attorneys Patented Sept. 22, 1953

2,652,656

UNITED STATES PATENT OFFICE 2,652,656

TRAP

Charles F. Glasser, Salladasburg, Pa.

Application March 10, 1949, Serial No. 80,684

1 Claim. (Cl. 43—105)

This invention relates to new and useful improvements and structural refinements in traps, more specifically, traps for catching live minnows and other fishing bait, and the principal object of the invention, is to facilitate convenient and expeditious catching of such bait in large quantities in the immediate vicinity of the region where fishing is to be undertaken, thus eliminating the conventionally experienced necessity of transporting live bait over considerable distances to the fishing site.

This object is achieved by the provision of the instant trap which embodies in its construction a net attached to a collapsible frame, an important feature of the invention residing in the provision of remotely controlled means for swiftly collapsing the frame so that a large number of minnows is caught in the associated net.

Another feature of the invention resides in the provision of a collapsible frame which is of a resilient nature, together with means for adjusting the resiliency of the frame in accordance with the requirements of the prevailing conditions.

Some of the advantages of the invention lie in its simplicity of construction, convenience of operation, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a perspective view of the invention in its extended position;

Figure 2 is an elevational view thereof in its collapsed position;

Figure 3 is a cross sectional detail, taken substantially in the plane of the line 3—3 in Figure 2;

Figure 4 is a cross sectional detail, taken substantially in the plane of the line 4—4 in Figure 3;

Figure 5 is a cross sectional detail, taken substantially in the plane of the line 5—5 in Figure 3, and Figure 6 is a cross sectional view, taken substantially in the plane of the line 6—6 in Figure 5.

Like characters of reference are employed to designate like parts in the specification and throughout the several views.

Referring now to the accompanying drawings, the invention consists of a trap designated generally by the reference character 10, the same embodying in its construction a substantially upright supporting shaft 12 which is provided at its upper end with an integral eye 14 whereby the entire device may be suitably attached to a combined supporting and actuating line 16, a collapsible frame designated generally by the reference character 18 being suspended from the shaft 12 in the manner presently to be described.

The collapsible frame 18 embodies in its construction a set of resilient ribs 20 which are provided at one end with arcuate portions or loops 22 to accommodate suitable pins or rivets 24 whereby the ribs 20 are pivotally attached to a cross-shaped spider 26 provided on the upper portion of the shaft 12.

The remaining portions of the ribs 20 are also formed with arcuate extremities or eyes 28 so that they may be connected to the corners of a net 30 by means of suitable attaching cords or strings 32, a center portion of the net 30 preferably being equipped with a foraminous pocket 34 to receive bait for the minnows which are to be caught.

Intermediate portions of the ribs 20 have rigidly secured thereto suitable brackets 36 and each of a set of rods 38, which also constitute components of the frame 18, is pivotally connected to one of the brackets 36 as at 40. The rods 38, in turn, are pivoted to a further spider 44, this being achieved by means of suitable pins or rivets 46 similar to the aforementioned rivets 24.

The aforementioned spider 26 is slidably adjustable on the shaft 12, but is provided with a set screw 48 which is engageable with the shaft and is employed for securing the upper spider 26 in a predetermined position on the shaft, as will be clearly apparent.

On the other hand, the lower spider 44 is provided with a lateral bore 50 which accommodates a spherical element or ball 52, a compression spring 54 and a retaining screw 56, these components being arranged as is best shown in Figure 6, from which it will be observed that the ball 52 is pressed by the spring 54 in engagement with an annular screw, depression or seat 58 with which the lower end portion of the shaft 12 is formed (see Fig. 3.)

It is to be noted that the spring 54 is sufficiently strong to retain the ball 52 in engagement with the seat 58 and thereby maintain the spider 44 in a predetermined position on the shaft 12, but at the same time, the spring 54 is sufficiently light to permit the ball 52 to become disengaged from the seat 58 when the shaft 12 is jerked upwardly, as indicated at 60 in Figures 1 and 3.

When the invention is placed in use, the spider 26 is locked in a predetermined position on the shaft 12 by simply tightening the screw 48 and the lower end portion of the shaft 12 is inserted in the spider 44 until the ball 52 is engaged with the seat 58. During this action the resilient ribs 20 of the frame 18 will become arcuated as shown in Figure 1 and the net 30 will be extended to a substantially flat position. Suitable bait may then be applied to the pocket 34 and the entire device may be lowered in water by means of the line 16. Thereupon, when a sufficient number of minnows are attracted to a position over the net 30, a smart upward jerk of the line 16 and the associated shaft 12 will cause the ball 52 to be disengaged from the seat 58 and by virtue of the resiliency of the ribs 20, the spider 44 will be caused to slide downwardly from the lower end portion of the shaft 12, thus collapsing the frame 18 and entrapping the minnows in the net 30, as indicated in Figure 2.

It should be repeated that the disengagement of the ball 52 from the seat 58 is effected by abrupt upward jerking of the shaft 12 while the weight of the water on the net 30 tends to retain the net and the associated frame 18 stationary. The speed with which the trap is collapsed is, of course, governed by the resiliency of the ribs 20, and this resiliency, in turn, may be pre-adjusted by simply loosening the screw 48 and sliding the spider 26 upwardly or downwardly on the shaft 12 so that the required adjustment, that is, light or heavy release, is achieved.

Referring again to the accompanying Figure 6, it is to be noted that the inner end portion of the bore 50 in the spider 44 is diametrically restricted, in other words, when the spider is drilled to provide the bore 50, the drill is not permitted to fully enter the central bore in which the shaft 12 is receivable, thus resulting in the formation of a diametrically reduced portion 62 in the bore 50, which functions as a seat for the ball 52 and prevents the ball from being expelled from the bore 50 by the spring 54 when the spider is disengaged from the shaft.

Attention is also directed to the fact that when a portion of the groove 58 engaged by the ball 52 becomes worn, the screw 48 may be loosened and the shaft 12 rotated in the spiders 26, 44 so that the ball is engageable with another portion of the groove, thus eliminating the necessity of replacing the shaft at frequent intervals.

It is believed that the advantages and use of the invention will be clearly apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

A minnow trap comprising an upright shaft, said shaft having an annular groove in the lower portion thereof, an upper bracket slidably positioned on said shaft, a set of resilient ribs pivotally attached at their upper ends to said upper bracket, a net attached to the lower ends of said ribs, a lower bracket rotatable and slidable on said shaft, a set of rods pivotally attached to said lower bracket and to intermediate portions of said ribs, and means extending through said upper bracket engaging said shaft lockingly vertically and adjustably securing said upper bracket to said shaft thereby flexing said resilient ribs under stress, the position of said upper bracket relative to said shaft determining the amount of stress on said ribs, the stress on said ribs determining the speed of closure of said trap, and a spring pressed ball provided in said lower bracket releasably engaging said shaft in said groove and releasably holding said net in a stretched position.

CHARLES F. GLASSER.

References Cited in the file of this patent
UNITED STATES PATENTS

| Number | Name | Date |
| --- | --- | --- |
| 482,635 | Hanish | Sept. 13, 1892 |
| 820,581 | La Londe | May 15, 1906 |
| 891,800 | Enrico | June 23, 1908 |
| 1,036,574 | Crane | Aug. 7, 1912 |
| 1,172,881 | Dodge | Feb. 22, 1916 |
| 1,463,062 | Roberts | July 24, 1923 |
| 1,888,138 | Myers et al. | Nov. 15, 1932 |
| 2,194,621 | Skrjanc et al. | Mar. 26, 1940 |